US010285020B2

(12) United States Patent
Wu et al.

(10) Patent No.: US 10,285,020 B2
(45) Date of Patent: May 7, 2019

(54) CONTINUING MULTIMEDIA BROADCAST MULTICAST SERVICES FOR OUT-OF-COVERAGE DEVICES

(71) Applicant: QUALCOMM Incorporated, San Diego, CA (US)

(72) Inventors: Zhibin Wu, Bedminster, NJ (US); Vincent D. Park, Budd Lake, NJ (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 1275 days.

(21) Appl. No.: 13/954,764

(22) Filed: Jul. 30, 2013

(65) Prior Publication Data

US 2015/0036579 A1    Feb. 5, 2015

(51) Int. Cl.
  *H04W 4/06*   (2009.01)
  *H04B 7/15*   (2006.01)
  *H04W 8/00*   (2009.01)

(52) U.S. Cl.
  CPC ............... *H04W 4/06* (2013.01); *H04B 7/15* (2013.01); *H04W 8/005* (2013.01)

(58) Field of Classification Search
  None
  See application file for complete search history.

(56) References Cited

U.S. PATENT DOCUMENTS

| 9,247,411 B2 | 1/2016 | Wu et al. |
| 2003/0231612 A1 | 12/2003 | Kim et al. |
| 2006/0107287 A1 * | 5/2006 | Lee .................. H04W 4/06 725/32 |
| 2008/0287057 A1 | 11/2008 | Zisimopoulos |

(Continued)

FOREIGN PATENT DOCUMENTS

| CN | 103141124 A | 6/2013 |
| JP | 2003229954 A | 8/2003 |

(Continued)

OTHER PUBLICATIONS

HTC, UE Relay for Public Safety, Jul. 15-19, 2013, 3GPP: SA WG2 Meeting 52#98, S2-132483, pp. 1-5.*

(Continued)

*Primary Examiner* — Hicham B Foud
(74) *Attorney, Agent, or Firm* — Holland & Hart LLP/Qualcomm

(57) ABSTRACT

Methods, systems, and apparatuses are described for managing a multimedia broadcast multicast service (MBMS). In one configuration, content of an MBMS may be received while operating in a coverage area of a base station. A transition to operate outside the coverage area of the base station may be sensed. A peer discovery signal to request a relay of the content of the MBMS may be transmitted. The peer discovery signal may include an identifier of the MBMS. In another configuration, a first peer discovery signal including an out-of-coverage status indicator for the mobile device or MBMS query and an identifier of an MBMS may be received from the mobile device. A determination may be made regarding whether to relay content of the MBMS. Upon determining to relay the content of the MBMS, a second peer discovery signal indicating a capability to relay the content of the MBMS may be transmitted.

36 Claims, 10 Drawing Sheets

(56) References Cited

U.S. PATENT DOCUMENTS

| | | | |
|---|---|---|---|
| 2010/0322136 A1* | 12/2010 | Kanazawa | H04L 1/0026 370/312 |
| 2011/0010340 A1* | 1/2011 | Hung | H04L 12/1886 707/623 |
| 2011/0268004 A1 | 11/2011 | Doppler et al. | |
| 2012/0005304 A1* | 1/2012 | Guo | H04L 12/1836 709/217 |
| 2012/0082098 A1* | 4/2012 | Oprescu-Surcobe | H04L 65/00 370/329 |
| 2012/0163235 A1* | 6/2012 | Ho | H04W 76/023 370/254 |
| 2013/0003640 A1 | 1/2013 | Yang et al. | |
| 2013/0039248 A1 | 2/2013 | Koskinen et al. | |
| 2013/0109301 A1 | 5/2013 | Hakola et al. | |
| 2013/0155954 A1* | 6/2013 | Wang | H04W 4/005 370/328 |
| 2013/0160101 A1* | 6/2013 | Hakola | H04W 76/023 726/7 |
| 2014/0198712 A1* | 7/2014 | Howard | H04W 84/047 370/312 |
| 2015/0029866 A1* | 1/2015 | Liao | H04W 4/008 370/241 |

FOREIGN PATENT DOCUMENTS

| | | |
|---|---|---|
| JP | 2004166209 A | 6/2004 |
| JP | 2005341300 A | 12/2005 |
| JP | 2009188926 A | 8/2009 |
| WO | WO-2011079054 A1 | 6/2011 |
| WO | WO-2012006446 A1 | 1/2012 |

OTHER PUBLICATIONS

IPEA/EPO, Second Written Opinion of the International Preliminary Examining Authority, Int'l. App. No. PCT/US2014/047603, dated Jun. 25, 2015, European Patent Office, Munich, DE, 6 pgs.

3GPP, "3rd Generation Partnership Project; Technical Specification Group Services and System Aspects; Study on Architecture Enhancements to Support Proximity Services (ProSe) (Release 12)," 3GPP TR 23.703 v0.5.0 (Jul. 2013) Technical Report, Jul. 2013, pp. 1-189, 3rd Generation Partnership Project, Sophia Antipolis, France.

Intel, "Hybrid PSS/MBMS Download Delivery of DASH-Formatted Content," Change Request 26.346 CR 0220 rev. 9.6.0, 3GPP TSG-SA4 Meeting #68, Kyoto, Japan, Apr. 16-20, 2012, S4-120493, revision of S4-120384, 3 pgs., XP 50639168A, 3rd Generation Partnership Project.

WiMAX Forum, "WiMAX End-to-End Network Systems Architecture (Stage 2: Architecture Tenets, Reference Model and Reference Points)," Dec. 15, 2005 Draft, 242 pgs., URL http://people.cs.nctu.edu.tw/~sylin/upload/051215_NWG_Stage-2.pdf.

ISA/EPO, International Search Report and Written Opinion of the International Searching Authority, Int'l. App. No. PCT/US2014/047603, dated Dec. 9, 2014, European Patent Office, Rijswijk, NL, 11 pgs.

Qualcomm Incorporated: "ProSe UE-to-Network Relays", S2-132455, SA WG2 Meeting #98, Valencia, Spain, Jul. 15-19, 2013, pp. 1-9.

* cited by examiner

CONTINUING MULTIMEDIA BROADCAST MULTICAST SERVICES FOR OUT-OF-COVERAGE DEVICES

BACKGROUND

A wireless communication network may include a number of base stations, NodeBs, or eNodeBs (eNBs) that can support communication for a number of mobile devices or user equipments (UEs). A UE may communicate with a base station via downlink and uplink. The downlink (or forward link) refers to the communication link from the base station to the UE, and the uplink (or reverse link) refers to the communication link from the UE to the base station.

In a 3GPP cellular network, broadcast and multicast services are transported via a transport service called multimedia broadcast multicast services (MBMS). A broadcast multicast service centre (BM-SC) server is responsible to disseminate the media content to a group of subscribers. Also, a UE that desires to deliver information to the group may send the information to the BM-SC server, which will then distribute the content to the members of the group. When a UE is using an MBMS but moves out of network coverage, the UE is unable to continue using the MBMS because the uplink and downlink connections to the BM-SC server are no longer available.

SUMMARY

The described features generally relate to one or more improved methods, systems, and/or apparatuses for managing a multimedia broadcast multicast services (MBMS).

A method for managing an MBMS is described. In one configuration, content of an MBMS may be received while operating in a coverage area of a base station. A transition to operate outside the coverage area of the base station may be sensed. A peer discovery signal to request a relay of the content of the MBMS may be transmitted. The peer discovery signal may include an identifier of the MBMS.

In some embodiments of the method, one or more peer discovery signals may be received from one or more devices operating within the coverage area of the base station. The one or more peer discovery signals may indicate the capability of the one or more devices to relay the content of the MBMS.

In some embodiments of the method, one of the devices operating within the coverage area of the base station may be identified to relay the content of the MBMS.

In some embodiments of the method, a direct link may be established with an identified device operating within the coverage area of the base station. The identified device may be an MBMS relay device for the content of the MBMS.

In some embodiments of the method, content of the MBMS may be transmitted to an identified device, operating within the coverage area of the base station, for retransmission to the base station.

In some embodiments of the method, unicast data may be transmitted to an identified device, operating within the coverage area of the base station, for retransmission to the base station.

In some embodiments of the method, a paging message ma be transmitted to an identified device operating within the coverage area of the base station. The paging message may indicate a desire to transmit data to the identified device. Subsequent to transmitting the paging message, the data may be transmitted to the identified device.

In some embodiments of the method, sensing the transition to operate outside the coverage area of the base station may occur after operating outside the coverage area of the base station.

In some embodiments of the method, sensing the transition to operate outside the coverage area of the base station may occur before operating outside the coverage area of the base station.

In some embodiments of the method, the identifier of the MBMS may include a temporary mobile group identifier (TMGI).

In some embodiments of the method, the peer discovery signal may include a Long Term Evolution (LTE) Direct peer discovery signal.

An apparatus for managing MBMS is also described. In one configuration, the apparatus may include a means for receiving content of an MBMS while operating in a coverage area of a base station, a means for sensing a transition to operate outside the coverage area of the base station, and a means for broadcasting a peer discovery signal to request a relay of the content of the MBMS. The peer discovery signal may include an identifier of the MBMS.

Another apparatus for managing an MBMS is also described. In one configuration, the apparatus may include a processor, a memory in electronic communication with the processor, and instructions stored in the memory. The instructions may be executable by the processor to receive content of an MBMS while operating in a coverage area of a base station, sense a transition to operate outside the coverage area of the base station, and broadcast a peer discovery signal to request a relay of the content of the MBMS. The peer discovery signal may include an identifier of the MBMS.

A computer program product for managing an MBMS is also described. The computer program product may include a non-transitory computer-readable medium storing instructions executable by a processor to receive content of an MBMS while operating in a coverage area of a base station, sense a transition to operate outside the coverage area of the base station, and broadcast a peer discovery signal to request a relay of the content of the MBMS. The peer discovery signal may include an identifier of the MBMS.

Another method for managing an MBMS is also described. In one configuration, a first peer discovery signal including an out-of-coverage status indicator for the mobile device or MBMS query and an identifier of an MBMS may be received from the mobile device. A determination may be made regarding whether to relay content of the MBMS. Upon determining to relay the content of the MBMS, a second peer discovery signal indicating a capability to relay the content of the MBMS may be transmitted.

In some embodiments of the method, transmitting the second peer discovery signal may include transmitting a paging message to the out-of-coverage mobile device to establish a direct link.

In some embodiments of the method, determining whether to relay the content of the MBMS may include acquiring an MBMS control channel (MCCH) to determine whether content of the MBMS can be received.

In some embodiments of the method, a paging message may be transmitted to the mobile device. The paging message may indicate a desire to transmit data to the mobile device. Subsequent to transmitting the paging message, the data may be transmitted to the mobile device.

In some embodiments of the method, a current status may be escalated to an MBMS relay status upon determining to relay the content of the MBMS.

In some embodiments of the method, the identifier of the MBMS may include a temporary mobile group identifier (TMGI).

In some embodiments of the method, the first and second peer discovery signals may be Long Term Evolution (LTE) Direct peer discovery signals.

An apparatus for managing an MBMS is also described. In one configuration, the apparatus may include means for receiving a first peer discovery signal from a mobile device, means for determining whether to relay content of the MBMS, and means for transmitting a second peer discovery signal indicating a capability to relay the content of the MBMS upon determining to relay the content of the MBMS. The first peer discovery signal may include an out-of-coverage status indicator for the mobile device or an MBMS query and an identifier of an MBMS.

Another apparatus for managing an MBMS is also described. The apparatus may include a processor, memory in electronic communication with the processor, and instructions stored in the memory. The instructions may be executable by the processor to receive a first peer discovery signal from a mobile device, determine whether to relay content of the MBMS, and transmit a second peer discovery signal indicating a capability to relay the content of the MBMS upon determining to relay the content of the MBMS. The first peer discovery signal may include an out-of-coverage status indicator for the mobile device or an MBMS query and an identifier of an MBMS.

A computer program product for managing an MBMS is also described. The computer program product may include a non-transitory computer-readable medium storing instructions executable by a processor to receive a first peer discovery signal from a mobile device, determine whether to relay content of the MBMS, and transmit a second peer discovery signal indicating a capability to relay the content of the MBMS upon determining to relay the content of the MBMS. The first peer discovery signal may include an out-of-coverage status indicator for the mobile device or MBMS query and an identifier of an MBMS.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A base station of a wireless communications system is associated with a coverage area. When a mobile device moves outside the coverage area of a base station, it may lose service via the wireless communications system with which the base station is associated. The loss of service may in some cases include the loss of an MBMS in which the mobile device was participating prior to losing service. In wireless peer-to-peer group communications, loss of MBMS service has two consequences. First, the out-of-coverage device can no longer receive the MBMS content delivered by the server, e.g., a BM-SC server. Second, the out-of-coverage device's self-generated content cannot be uploaded to the server, e.g., the BM-SC server, and be delivered to other group peers by the MBMS service. To provide for continued participation in the MBMS, the mobile device may use an in-coverage device as an MBMS relay for both the traffic from and to the server, e.g., the BM-SC server. More specifically, and by way of example, the mobile device may broadcast a first peer discovery signal to request a relay of the content of the MBMS. A device within the coverage area of the base station that receives the first peer discovery signal (and possibly another mobile device) may then determine whether it is capable of relaying the content of the MBMS. When the in-coverage device is capable of relaying the MBMS content, it may transmit a second peer discovery signal to the mobile device, indicating its capability to relay the MBMS content. The mobile device may receive such a second peer discovery signal from each of a plurality of in-coverage devices, and may then identify and establish a direct link (e.g., a peer-to-peer link) with one of the devices to relay the content of the MBMS. This peer-to-peer link between the MBMS relay and the out-of-coverage device may take the form of a unicast, multicast, or broadcast link. In some cases, the peer discovery signals may be Long Term Evolution (LTE) Direct Peer-Discovery Signals.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
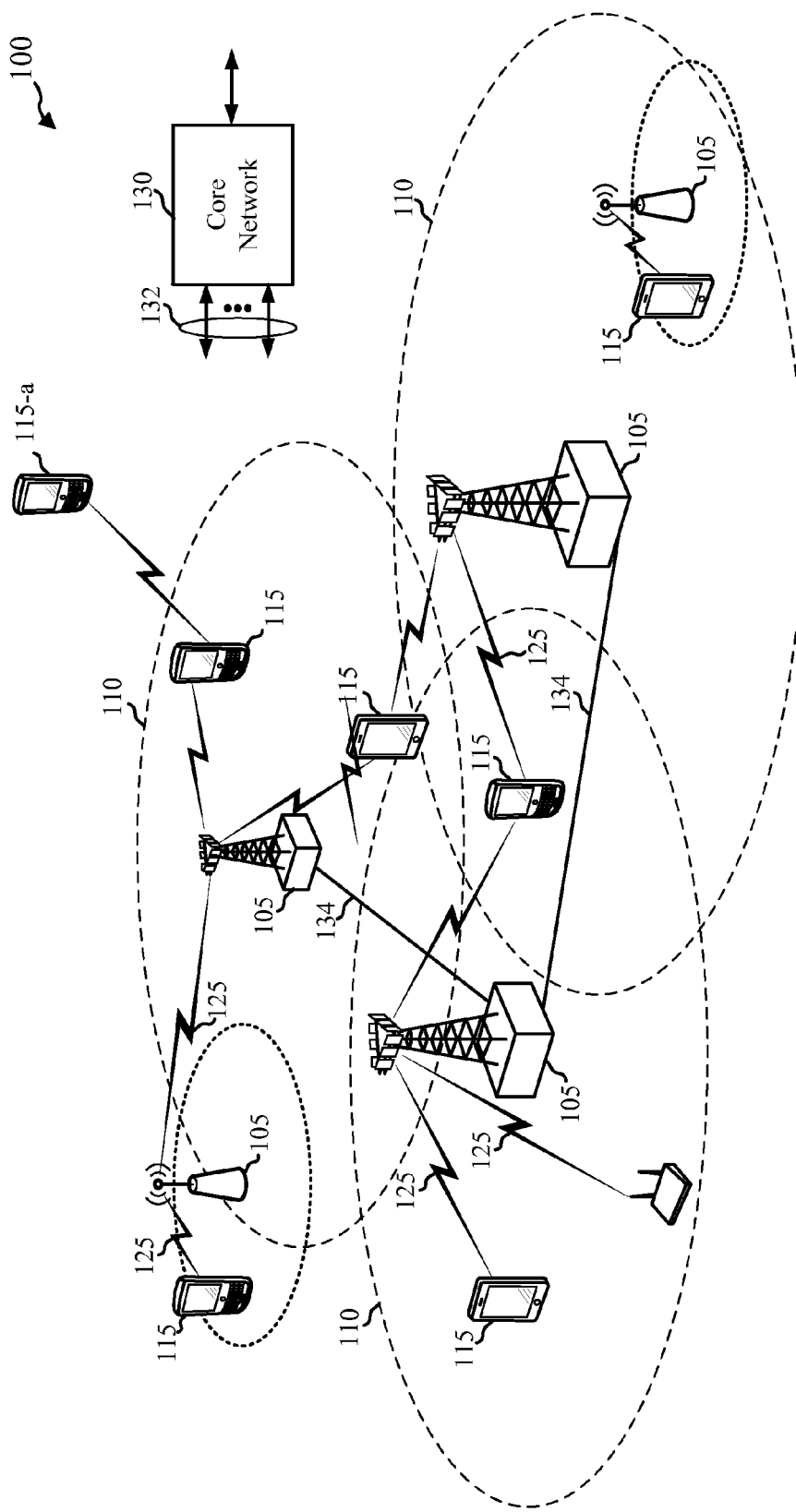
FIG. 1 is a block diagram of an example of a wireless communications system.

Referring first to FIG. 1, a diagram illustrates an example of a wireless communications system 100. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul links 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless communications system 100, and each UE may be stationary or mobile. A UE 115 may also be referred to by those skilled in the art as a mobile device, a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, a relay, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In one embodiment, a UE 115 within a coverage area of a base station 105 may serve as a relay of data for a UE 115-a that is outside the coverage area of the base station 105. For example, the in-coverage UE 115 may relay (or retransmit) communications received from the base station 105 to the out-of-coverage UE 115-a. Similarly, the in-coverage UE 115 may relay to the base station 105 communications received from the out-of-coverage UE. In some cases, the relayed data may include the content of an MBMS.

The communication links 125 shown in wireless communications system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Figure 2:
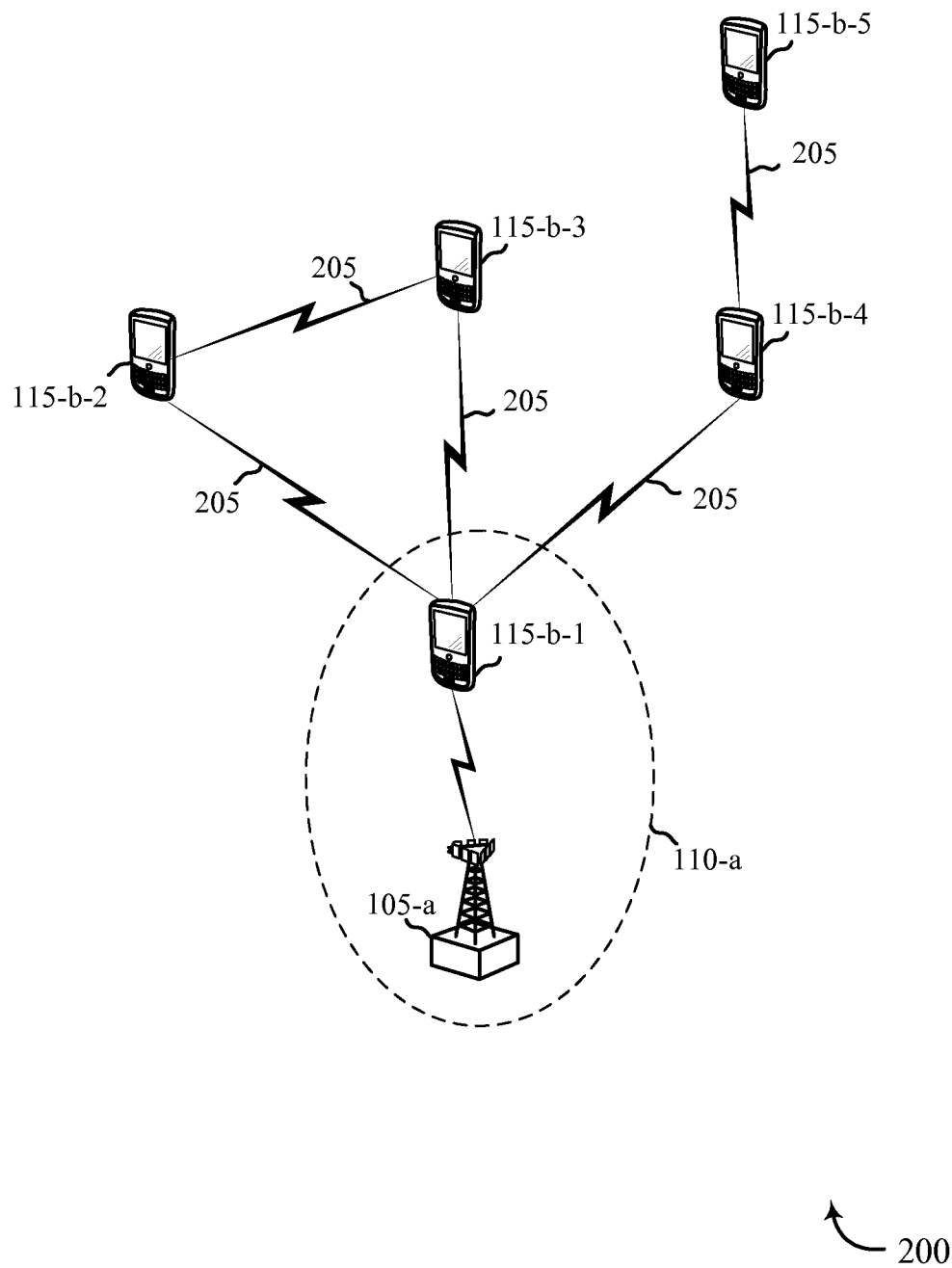
FIG. 2 is a block diagram of an example of an environment in which wireless communications may be managed in accordance with various embodiments.

FIG. 2 is a block diagram of an example of an environment 200 in which the present systems and methods may be implemented. In one configuration, a base station 105-a may communicate with one or more devices that fall within a coverage area 110-a of the base station 105-a. In one example, an in-coverage mobile device 115-b-1 (or other device capable of providing relaying services) may receive/transmit communications from/to the base station 105-a. One or more mobile devices 115-b-2, 115-b-3, 115-b-4, 115-b-5 may be outside the coverage area 110-a of the base station 105-a. The base station 105-a and the mobile devices 115-b may be examples of the base stations 105 and mobile devices 115 described with reference to FIG. 1.

In one embodiment, the in-coverage mobile device 115-b-1 may receive, from an out-of-coverage mobile device (e.g., mobile device 115-b-2), a first peer discovery signal 205. The first peer discovery signal may include an out-of-coverage status for the mobile device 115-b-2 (or an MBMS query), as well as an identifier of the MBMS in which the mobile device 115-b-2 would like to participate. The in-coverage mobile device 115-b-1 may then determine whether to relay the content of the MBMS. Upon determining to relay the content of the MBMS, the in-coverage mobile device 115-b-1 may transmit a second peer discovery signal 205 indicating a capability to relay the content of the MBMS.

The peer discovery signals 205 may in some cases be LTE Direct Peer-Discovery Signals. In one configuration, each signal 205 may include an identifier of the transmitting device 115-b. The identifier may in some cases be a media access control (MAC) address of the transmitting device 115-b. In the case of the in-coverage mobile device 115-b-1, the second peer discovery signal 205 may include an MBMS relay status of the mobile device 115-*b*-1 and/or a paging message to establish a direct link with the out-of-coverage mobile device 115-*b*-2. The MBMS relay status may indicate whether the in-coverage mobile device 115-*b*-1 is capable of providing relay services for the mobile device 115-*b*-2. The second peer discovery signal 205 may also indicate whether the mobile device 115-*b*-1 is capable of relaying the content of the MBMS in which the out-of-coverage mobile device 115-*b*-2 is interested.

In one example, an out-of-coverage mobile device may receive the second peer discovery signal from more than one in-coverage mobile device. The out-of-coverage mobile device may then select one of the in-coverage mobile devices to provide relay services. The determination as to which in-coverage mobile device to select may be based on the comparative strengths of the received peer discovery signals; the identities of the in-coverage mobile devices; the MBMS relay statuses of the in-coverage mobile devices; etc.

In one configuration, the out-of-coverage mobile device 115-*b*-2 may broadcast the first peer discovery signal 205 after operating outside the coverage area 110-*a* of the base station 105-*a*. In another configuration, the out-of-coverage mobile device 115-*b*-2 may broadcast the first peer discovery signal 205 before operating outside the coverage area 110-*a* of the base station 105-*a*. For example, the mobile device 115-*b*-2 may determine it is about to leave the coverage area 110-*a* of the base station (e.g., based on a declining signal strength of received communications) and proactively broadcast the first peer discovery signal 205.

In one example, out-of-coverage mobile devices 115-*b*-2, 115-*b*-3, may communicate with each other. For example, the mobile devices 115-*b*-2, 115-*b*-3 may establish a direct peer-to-peer connection. The in-coverage mobile device 115-*b*-1 may also provide relay services to one or more out-of-coverage mobile devices. In one configuration, a first out-of-coverage mobile device 115-*b*-4 may serve as an MBMS relay device for a second out-of-coverage mobile device 115-*b*-5. The first out-of-coverage mobile device 115-*b*-4 may transmit a peer discovery signal 205 to inform the second out-of-coverage mobile device 115-*b*-5 that it (115-*b*-4) is capable of providing relay services. As another example, the second out-of-coverage mobile device 115-*b*-5 may transmit a signal 205 requesting relay services from the first out-of-coverage mobile device 115-*b*-4. As a result, the in-coverage mobile device 115-*b*-1 may relay communications to/from the base station 105-*a* from/to the first out-of-coverage UE 115-*b*-4. The first out-of-coverage mobile device 115-*b*-4 may relay at least a part of the communications from/to the second out-of-coverage mobile device 115-*b*-5.

Figure 3:
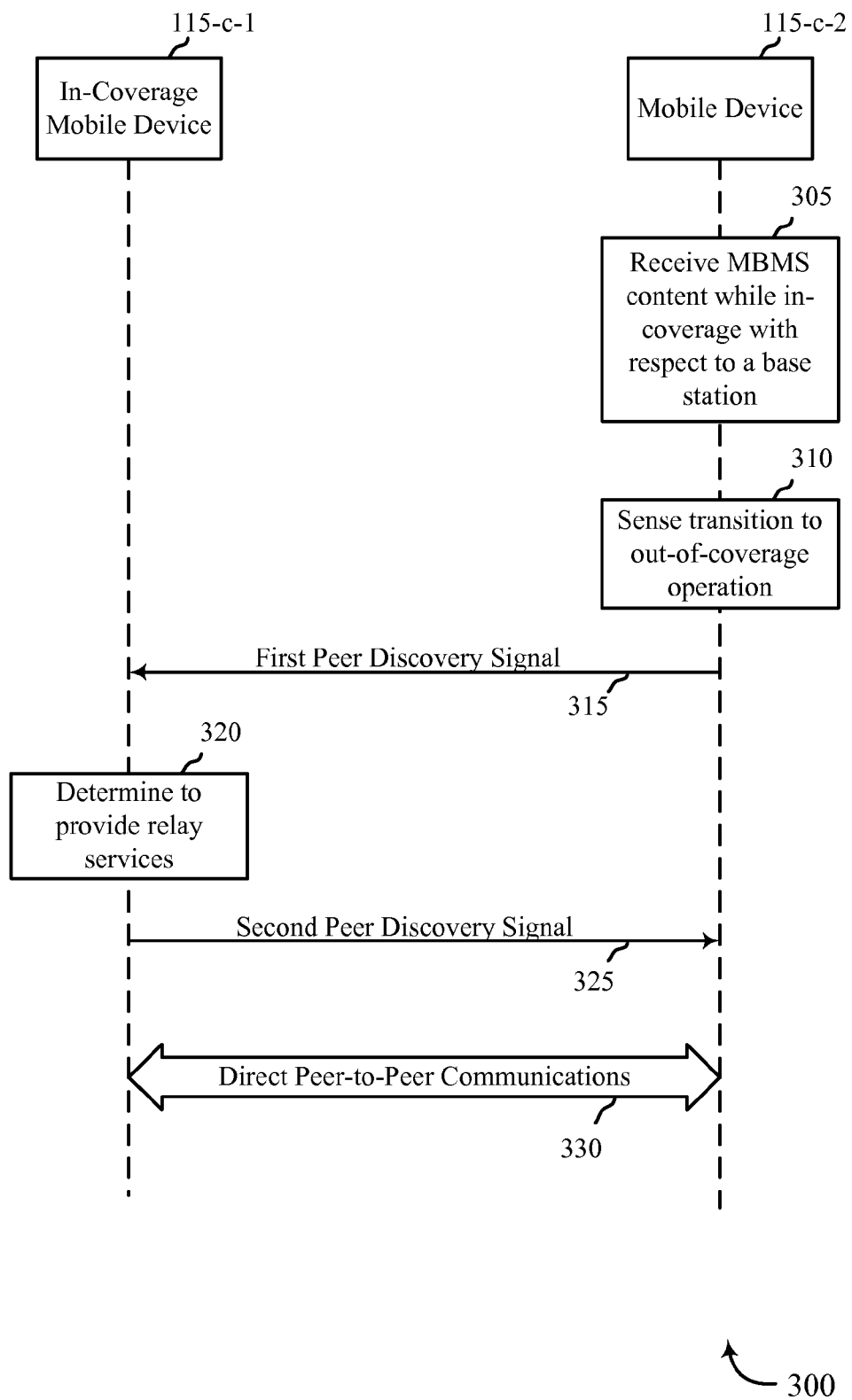
FIG. 3 is a message flow diagram illustrating one embodiment of communications between a mobile device operating in a coverage area of a base station and a mobile device operating out of the coverage area of the base station, in accordance with various embodiments.

FIG. 3 is a message flow diagram 300 illustrating one embodiment of communications between an in-coverage mobile device 115-*c*-1 (or other device capable of providing relaying services) and a mobile device 115-*c*-2. The mobile devices 115-*c* may be examples of the mobile devices 115 described with reference to FIGS. 1 and/or 2.

In one configuration, and at block 305, the mobile device 115-*c*-2 may initially operate within the coverage area of a base station 105 and receive content of an MBMS from the base station 105. At block 310, the mobile device 115-*c*-2 may sense a transition from in-coverage operation to out-of-coverage operation with respect to the base station 105 (e.g., a transition to operation outside the coverage area of the base station 105). The mobile device 115-*c*-2 may sense the transition to out-of-coverage operation before or after operating outside the coverage area of the base station 105. In the former case, the mobile device 115-*c*-2 may, for example, sense the transition to out-of-coverage operation based on a declining signal strength of communications it receives from the base station 105.

Upon sensing the transition to out-of-coverage operation, the out-of-coverage mobile device 115-*c*-2 may broadcast a first peer discovery signal 315. The first peer discovery signal 315 may include an identifier of the MBMS in which it was participating while operating within the coverage area of the base station 105. The first peer discovery signal may be transmitted using an LTE Direct, Wi-Fi Direct, Wi-Fi ad hoc, Bluetooth, and/or other radio access technology. The identifier of the MBMS may include a temporary mobile group identifier (TMGI) when the base station 105 providing the MBMS is an LTE/LTE-A/UMTS base station.

Upon receiving the first peer discovery signal 315, the in-coverage mobile device 115-*c*-1 may determine whether to relay content of the MBMS at block 320. This determination may be based on whether the in-coverage mobile device 115-*c*-1 can receive the MBMS content specified by the MBMS identifier, e.g., TMGI. This determination may also be based on the available battery power or bandwidth of the in-coverage mobile device 115-*c*-1, the strength of the first peer discovery signal, whether the in-coverage mobile device 115-*c*-1 is already providing relay services to another out-of-coverage mobile device, the type of relay services requested by the out-of-coverage mobile device 115-*c*-2, etc. Upon determining to relay the content of the MBMS, the in-coverage mobile device 115-*c*-1 may transmit to the out-of-coverage mobile device 115-*c*-2 a second peer discovery signal 325 indicating its capability to relay the content of the MBMS. The in-coverage mobile device 115-*c*-1 and the out-of-coverage mobile device 115-*c*-2 may then establish a direct link 330 (e.g., a peer-to-peer link) for the transmission of MBMS content. This direct peer-to-peer link 330 between the in-coverage mobile device (i.e., the MBMS relay device) and the out-of-coverage mobile device may take the form of a unicast, multicast, or broadcast link.

Data may be received and/or transmitted by the out-of-coverage mobile device 115-*c*-2 via the direct link. In some cases, this may include receiving, at the out-of-coverage mobile device 115-*c*-2, content of the MBMS relayed from the base station 105 by the in-coverage mobile device 115-*c*-1. In other cases, this may include transmitting content of the peer-to-peer group communication from the out-of-coverage mobile device 115-*c*-2 to the in-coverage mobile device 115-*c*-1 for retransmission to the base station 105. The base station 105 may then send the content to a server, e.g., a BM-SC server, and the server may broadcast the content to other subscribers of the MBMS. In still other cases, transmitting data via the direct link may include transmitting unicast data from the out-of-coverage mobile device 115-*c*-2 to the in-coverage mobile device 115-*c*-1, for retransmission to the base station 105.

Prior to transmitting data to the out-of-coverage mobile device 115-*c*-2, the in-coverage mobile device 115-*c*-1 may transmit a paging message to the out-of-coverage mobile device 115-*c*-2. The paging message may indicate a desire of the in-coverage mobile device 115-*c*-1 to transmit data to the out-of-coverage mobile device 115-*c*-2. Prior to transmitting data to the in-coverage mobile device 115-*c*-1, the out-of-coverage mobile device 115-*c*-2 may transmit a paging message to the in-coverage device 115-*c*-1. The paging message may indicate a desire of the out-of-coverage mobile device 115-*c*-2 to transmit data to the in-coverage mobile device 115-*c*-1. Data transmitted to the in-coverage mobile device 115-*c*-1 may be relayed to the base station 105.

Figure 4:
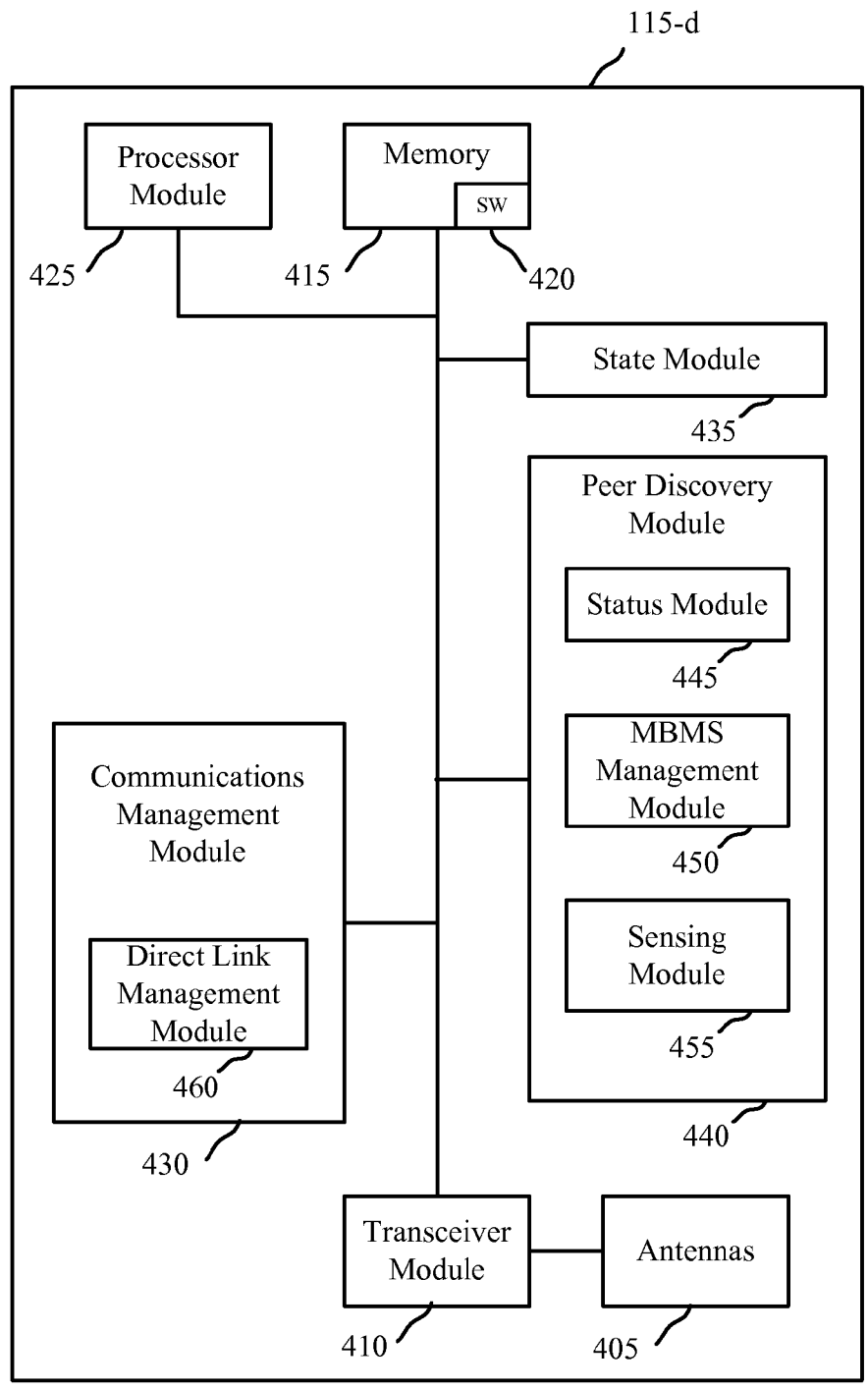
FIG. 4 is a block diagram of an example of a mobile device in accordance with various embodiments.

FIG. 4 is an example of a block diagram 400 of a mobile device 115-*d*. In some embodiments, the mobile device 115-*d* may embody one or more aspects of one of the mobile devices 115 described with reference to FIGS. 1, 2, and/or 3. The mobile device 115-*d* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*d* may have an internal power supply (not shown), such as a small battery, to facilitate mobile operation.

The mobile device 115-*d* may include antennas 405, a transceiver module 410, memory 415, and a processor module 425, which each may be in communication, directly or indirectly, with each other (e.g., via one or more buses). The transceiver module 410 may be configured to communicate bi-directionally, via the antennas 405 and/or one or more wired or wireless links, with one or more networks, as described above. For example, the transceiver module 410 may be configured to communicate bi-directionally with one or more of the base stations 105 of FIGS. 1, 2, and/or 3. The transceiver module 410 may also be configured to communicate with one or more other mobile devices 115, either as a relay for the one or more other mobile devices 115, or as a device in need of relaying services from one or more other mobile devices 115. The transceiver module 410 may include a modem configured to modulate packets and provide the modulated packets to the antennas 405 for transmission, and to demodulate packets received from the antennas 405. While the mobile device 115-*d* may include a single antenna, the mobile device 115-*d* will typically include multiple antennas 405 for multiple links.

The memory 415 may include random access memory (RAM) and read-only memory (ROM). The memory 415 may store computer-readable, computer-executable software code 420 containing instructions that are configured to, when executed, cause the processor module 425 to perform various functions (e.g., call processing, database management, message routing, etc.). Alternatively, the software code 420 may not be directly executable by the processor module 425, but may be configured to cause the mobile device 115-*d* (e.g., when compiled and executed) to perform various of the functions described herein.

The processor module 425 may include an intelligent hardware device, e.g., a central processing unit (CPU), a microcontroller, an application specific integrated circuit (ASIC), etc. The processor module 425 may include a speech encoder (not shown) configured to receive audio via a microphone, convert the audio into packets (e.g., 30 ms in length) representative of the received audio, provide the audio packets to the transceiver module 410, and provide indications of whether a user is speaking. Alternatively, an encoder may only provide packets to the transceiver module 410, with the provision or withholding/suppression of the packet itself providing the indication of whether a user is speaking.

According to the architecture of FIG. 4, the mobile device 115-*d* may further include a communications management module 430, a state module 435, and a peer discovery module 440. The communications management module 430 may establish and manage communications with base stations 105 and/or other mobile devices 115, including the transmission of MBMS content from the base station and the transmission of relevant data to a BM-SC server, via base stations 105 and/or other mobile devices 115. By way of example, the communications management module 430 may be a component of the mobile device 115-*d* in communication with some or all of the other components of the mobile device 115-*d* via a bus. Alternatively, functionality of the communications management module 430 may be implemented as a component of the transceiver module 410, as a computer program product, and/or as one or more controller elements of the processor module 425. The communications management module 430 may in some cases include a direct link management module 460. The module 460 may be used to establish a direct link (e.g., a peer-to-peer link) with another device (e.g., another mobile device). This direct peer-to-peer link between the relay and the out-of-coverage device can take the form of a unicast, multicast, or broadcast link.

The state module 435 may reflect and control the current device state (e.g., context, authentication, base station association, other connectivity issues).

The peer discovery module 440 may identify the mobile device 115-*d* to other mobile devices 115. The peer discovery module 440 may also identify other mobile devices 115, such as 1) mobile devices 115 that are out of the coverage area of a base station 105, which mobile devices 115 may use the mobile device 115 as an MBMS relay device, and/or 2) in-coverage mobile devices 115 that may be capable of providing relaying services to the mobile device 115-*d* when the mobile device 115-*d* is out of the coverage area of a base station 105.

The peer discovery module 440 may include a status module 445, an MBMS management module 450, and/or a sensing module 455. The status module 445 may determine whether the mobile device 115-*d* is capable of functioning as an MBMS relay device and providing relay services. The status module 445 may also determine when the mobile device 115-*d* transitions to (or from) an MBMS relay status. For example, the status module 445 may analyze the available power or bandwidth of the mobile device 115-*d*, whether the mobile device 115-*d* possesses LTE Direct, Wi-Fi Direct, Wi-Fi ad hoc, Bluetooth, and/or other capabilities, etc. Upon determining that it is capable of providing relay services, the status module 445 may transition the status of the mobile device 115-*d* to an MBMS relay status. The mobile device 115-*d* may then transmit or broadcast a peer discovery signal 205 indicating a capability of the mobile device 115-*d* to function as an MBMS relay device. An out-of-coverage mobile device 115 may receive the transmitted or broadcast signal and determine whether to use the mobile device 115-*d* as an MBMS relay device.

In one configuration, the MBMS management module 450 may analyze service announcement information received for at least one MBMS bearer service. The module 450 may identify at least a subset of the service announcement information. The identified subset of the MBMS service announcement information may be broadcast to one or more out-of-coverage mobile devices along with the peer discovery signal indicating its MBMS relay status. The mobile device 115-*d* may relay content of the MBMS bearer service to the one or more out-of-coverage mobile devices.

The sensing module 455 may sense when the mobile device 115-*d* is about to be out of range of a base station 105. The sensing module 455 may also determine when the mobile device 115-*d* is already out of range of a base station 105. Upon sensing that the mobile device 115-*d* is about to transition out of the coverage area (or has already transitioned out of the coverage area) of a base station 105, the mobile device 115-*d* may broadcast a peer discovery signal 205 to request relay services. One or more mobile devices that are still within the coverage area of a base station 105 may receive the broadcast and determine whether to provide the relay services.

The components of the mobile device 115-*d* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-*d*.

Figure 5:
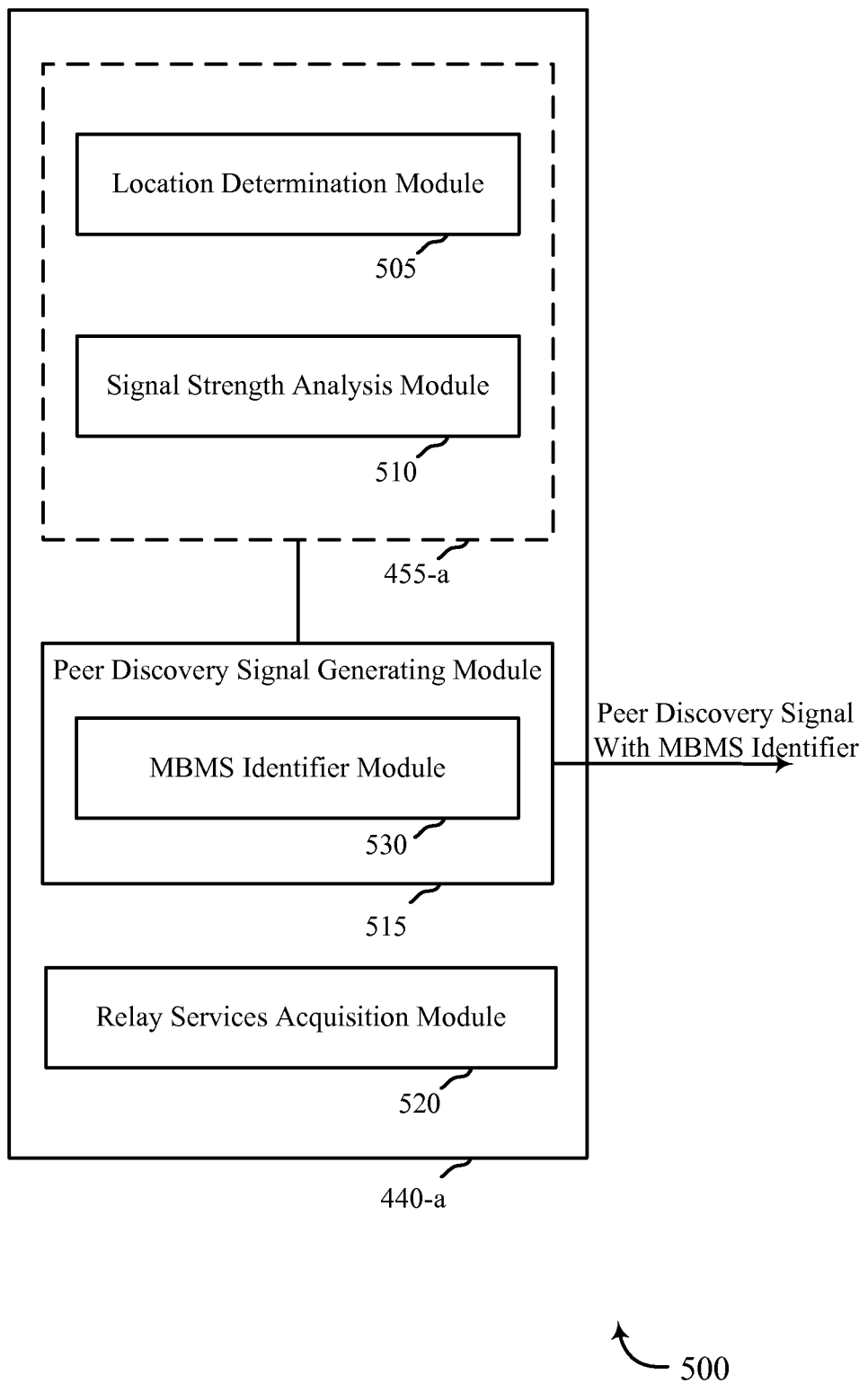
FIGS. 5 and 6 are block diagrams of examples of a peer discovery module in accordance with various embodiments.

FIG. 5 is a block diagram 500 of an example of a peer discovery module 440-*a*. In some embodiments, the peer discovery module 440-*a* may be an example of one or more aspects of the peer discovery module 440 described with reference to FIG. 4. The peer discovery module 440-*a* may include a sensing module 455-*a*, a peer discovery signal generating module 515, and/or a relay services acquisition module 520. Each of these components may be in communication with each other. In some embodiments, the sensing module 455-*a* may be an example of one or more aspects of the sensing module 455 described with reference to FIG. 4.

The components of the peer discovery module 440-*a* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

FIG. 5 illustrates an example of how the peer discovery module 440-*a*, when residing in a mobile device 115 that moves outside the coverage area of a base station 105, may generate a peer discovery signal to request a relay of the content of an MBMS.

The sensing module 455-*a* may sense when the mobile device 115 has moved outside the coverage area of the base station 105. The sensing module 455-*a* may also, or alternately, sense when the mobile device 115 is about to move outside the coverage area of the base station 105. To assist in these determinations, the sensing module 455-*a* may include a location determination module 505. The location determination module 505 may sense the location of the mobile device 115 using global positioning system (GPS) coordinates and/or other location information, and may determine (or assist in determining) whether the mobile device 115 is likely to be outside the coverage area of the base station 105. The signal strength analysis module 510 may also, or alternately, be used to determine whether the mobile device 115 has moved outside the coverage area of the base station 105 (or is about to move outside the coverage area). In some cases, the signal strength analysis module 510 may interpret a declining signal strength of base station communications, and/or base station communications having a signal strength below a threshold, as indicative of the mobile device 115 having moved outside the coverage area of the base station 105 (or indicative of the mobile device 115 being about to move outside the coverage area of the base station 105).

Upon sensing that the mobile device 115 is about to transition outside the coverage area of the base station 105 (or has already transitioned outside the coverage area), the sensing module 455-*a* may cause the peer discovery signal generating module 515 to broadcast a peer discovery signal to request a relay of the content of the MBMS. The peer discovery signal generating module 515 may in some cases include an MBMS identifier module 530 to generate an identifier of the MBMS for inclusion in the peer discovery signal. One or more mobile devices that are still in the coverage area of the base station 105 may receive the peer discovery signal and determine whether to relay the MBMS content of the identified MBMS to the mobile device 115.

The peer discovery signal may in some cases be an LTE Direct, Wi-Fi Direct, Wi-Fi ad hoc, or Bluetooth discovery signal. The identifier of the MBMS may include a TMGI when the base station 105 providing the MBMS is an LTE/LTE-A/UMTS base station.

Upon receiving one or more peer discovery signals from one or more devices operating within the coverage area of the base station 105, where the one or more signals indicate the capability of the one or more devices to relay the content of the identified MBMS, a module such as the direct link management module 460 described with reference to FIG. 4 may identify one of the devices operating within the coverage area of the base station 105 to relay the content of the MBMS, and may establish a direct link (e.g., a peer-to-peer link) with the identified device operating within the coverage area of the base station. The identified device may be an MBMS relay device for the content of the MBMS.

Figure 6:
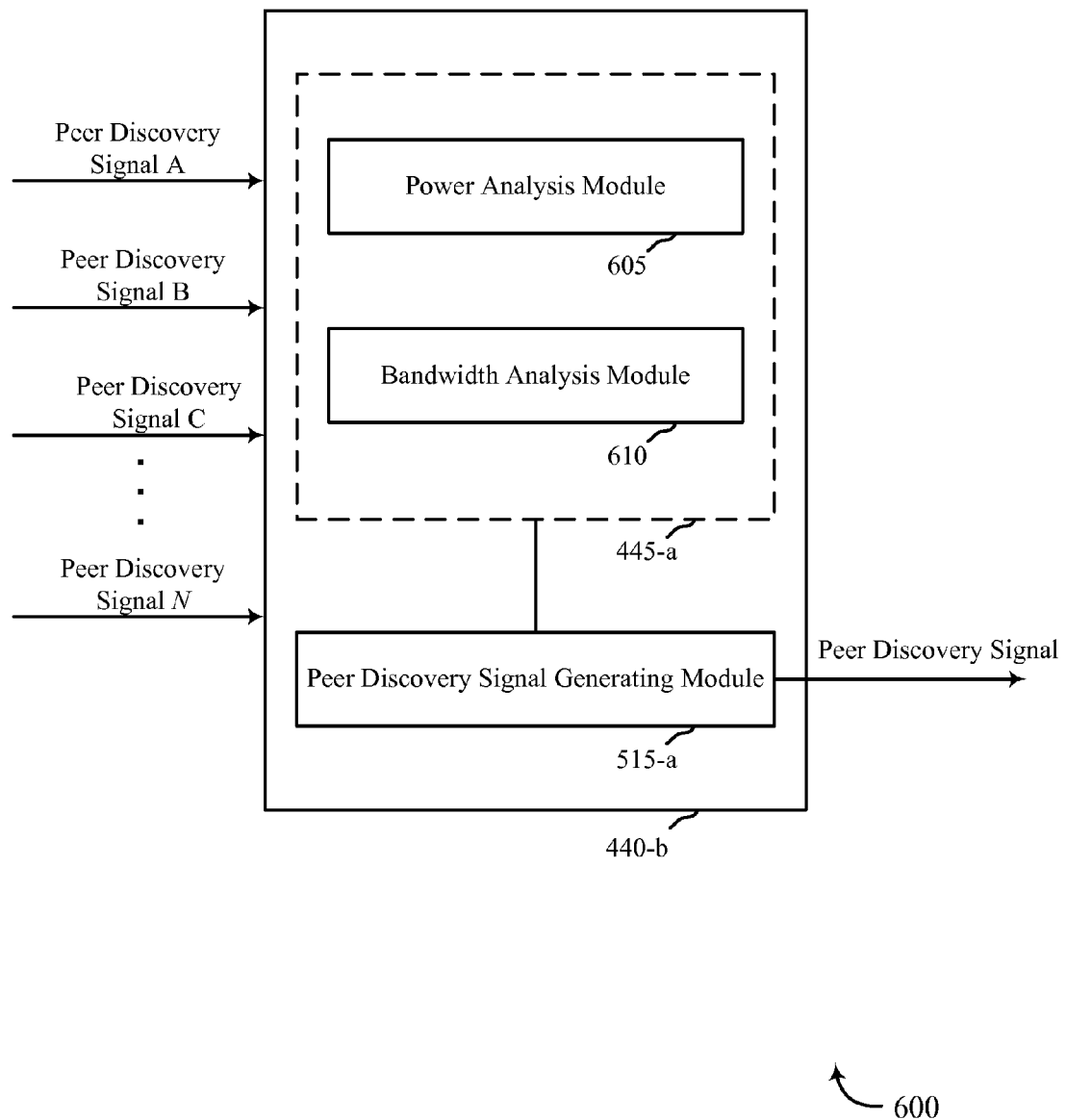

FIG. 6 is a block diagram 500 of an example of a peer discovery module 440-*b*. In some embodiments, the peer discovery module 440-*b* may be an example of one or more aspects of the peer discovery module 440 described with reference to FIG. 4. The peer discovery module 440-*a* may include a status module 445-*a*, and/or a peer discovery signal generating module 515-*a*. Each of these components may be in communication with each other. In some embodiments, the status module 445-*a* may be an example of the status module 445 described with reference to FIGS. 4 and/or the peer discovery signal generating module 515-*a* may be an example of one or more aspects of the respective peer discovery signal generating module 515 described with reference to FIG. 5.

The components of the peer discovery module 440-*b* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

FIG. 6 illustrates an example of how the peer discovery module 440-*b*, when residing in a device 115 that operates within the coverage area of a base station 105, may generate a peer discovery signal to indicate a capability to relay the content of an identified MBMS.

The status module 445-a may receive a first peer discovery signal (i.e., a Peer Discovery Signal A) from an out-of-coverage mobile device 115. The first peer discovery signal may include an out-of-coverage status indicator for the mobile device 115 (or an MBMS query), as well as an identifier of an MBMS. The first peer discovery signal may in some cases be an LTE Direct, Wi-Fi Direct, Wi-Fi ad hoc, or Bluetooth discovery signal. The identifier of the MBMS may include a TMGI when the base station 105 providing the MBMS is an LTE/LTE-A/UMTS base station.

Upon receiving the first peer discovery signal, the status module 445-a may determine whether to relay content of the MBMS. The determination to relay content may be made for an in-coverage device in which the peer discovery module 440-b is implemented. In some cases, the in-coverage device may be one of the mobile devices 115. In other cases, the in-coverage device may be another form of in-coverage device that is capable of relaying the content of the MBMS.

In some embodiments, the status module 445-a may acquire an MBMS control channel (MCCH). The information contained in the MCCH may be used to determine whether the MBMS identified in the first peer discovery signal can be received by this mobile device from one or more base stations.

In some cases, the status module 445-a may include a power analysis module 605 for determining whether an available operating power of the device in which the peer discovery module is implemented exceeds a threshold. In some cases, the status module 445-a may only transition the device to an MBMS relay status upon determining that the available operating power of the device exceeds the operating power threshold. Otherwise, the device may be maintained in a non-relay status. In this manner, the power analysis module 605 may determine, for example, whether the device has sufficient operating power to provide for its own functions as well as for relaying the content of the MBMS identified by the out-of-coverage mobile device 115.

The status module 445-a may also include a bandwidth analysis module 610 for determining whether an available transmission bandwidth of the device exceeds a threshold. In some cases, the status module 445-a may only transition the device to an MBMS relay status upon determining that the available bandwidth of the device exceeds the available bandwidth threshold. Otherwise, the device may be maintained in a non-relay status. In this manner, the bandwidth analysis module 610 may ensure, for example, that the device has enough bandwidth to serve its own functions as well as for relaying the content of the identified MBMS.

The status module 445-a may in some cases analyze additional or alternative factors when determining its capability to relay the content of the identified MBMS. For example, the status module 445-a may determine whether the candidate MBMS relay device possesses LTE Direct capabilities.

Upon determining to relay the identified MBMS, the status module 445-a may cause the peer discovery signal generating module 515-a to broadcast a second peer discovery signal indicating a capability to relay the content of the MBMS. The out-of-coverage mobile device 115 that transmitted the first peer discovery signal may receive the second peer discovery signal. The second peer discovery signal may in some cases be an LTE Direct, Wi-Fi Direct, Wi-Fi ad hoc, or Bluetooth discovery signal.

A module such as the direct link management module 460 described with reference to FIG. 4 may establish a direct link (e.g., a peer-to-peer link) with the out-of-coverage mobile device 115. The direct peer-to-peer link between the MBMS relay device and the out-of-coverage mobile device 115 may take the form of a unicast, multicast, or broadcast link.

In some embodiments, the status module 445-a, and/or peer discovery signal generating module 515-a may perform the operations described above for each of a number of peer discovery signals (e.g., Peer Discovery Signals A, B, C, . . . , N) received from one or more out-of-coverage mobile devices 115.

Figure 7:
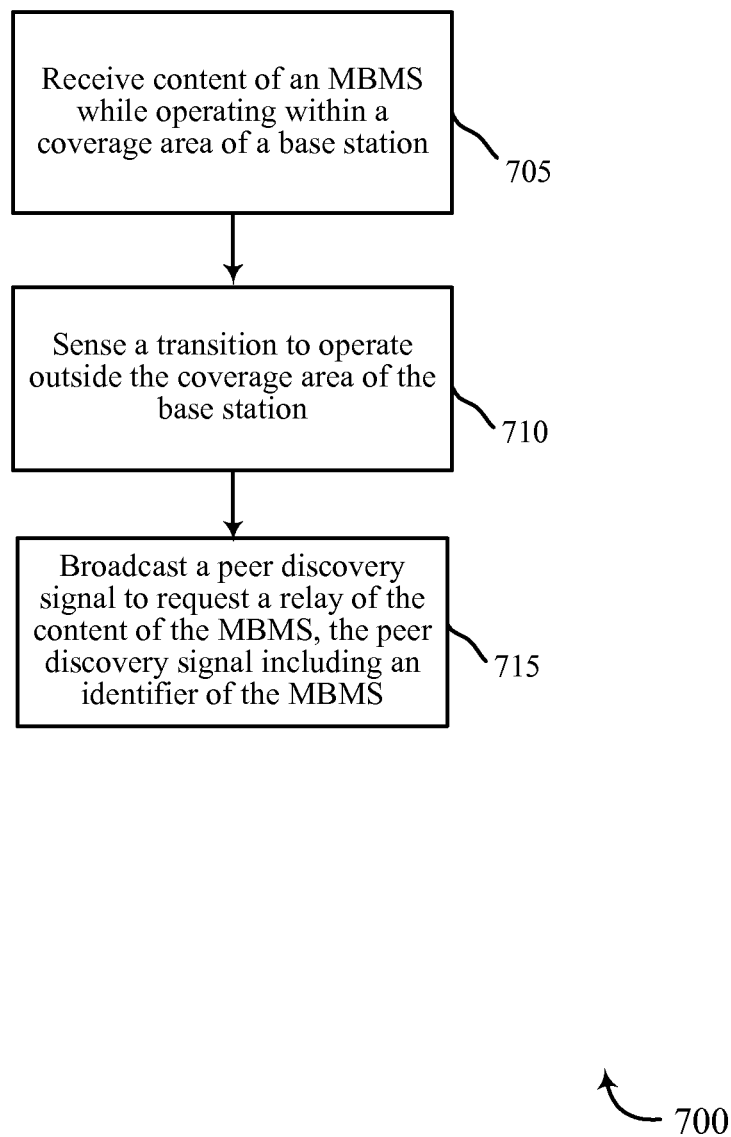
FIGS. 7-10 are flowcharts of various methods for managing an MBMS in accordance with various embodiments.

FIG. 7 is a flow chart illustrating an embodiment of a method 700 for managing an MBMS. For clarity, the method 700 is described below with reference to aspects of one or more of the mobile devices 115 described with reference to FIGS. 1, 2, 3, and/or 4. In some implementations, the peer discovery module 440 described with reference to FIGS. 4 and/or 5 may execute one or more sets of codes to control the functional elements of a mobile device 115 to perform the functions described below.

At block 705, content of an MBMS may be received while operating in a coverage area of a base station, such as one of the base stations 105 described with reference to FIGS. 1 and/or 2. In some cases, the content may be received by a mobile device 115. The mobile device 115 may be operating within the coverage area of the base station 105. In some embodiments, the content may be received at block 705 using the communications management module 430 described with reference to FIG. 4.

At block 710, a transition to operate outside the coverage of the base station 105 may be sensed (e.g., by the mobile device 115). In some embodiments, the transition may be sensed at block 710 using the peer discovery module 440 and/or sensing module 455 described with reference to FIGS. 4 and/or 5.

At block 715, a peer discovery signal to request a relay of the content of the MBMS may be broadcast. The peer discovery signal may include an identifier of the MBMS. In some embodiments, the peer discovery signal may be broadcast at block 715 using the peer discovery module 440 described with reference to FIGS. 4 and/or 5, and/or the peer discovery signal generating module 515 described with reference to FIG. 5.

Therefore, the method 700 may be used for managing an MBMS. It should be noted that the method 700 is just one implementation and that the operations of the method 700 may be rearranged or otherwise modified such that other implementations are possible.

Figure 8:
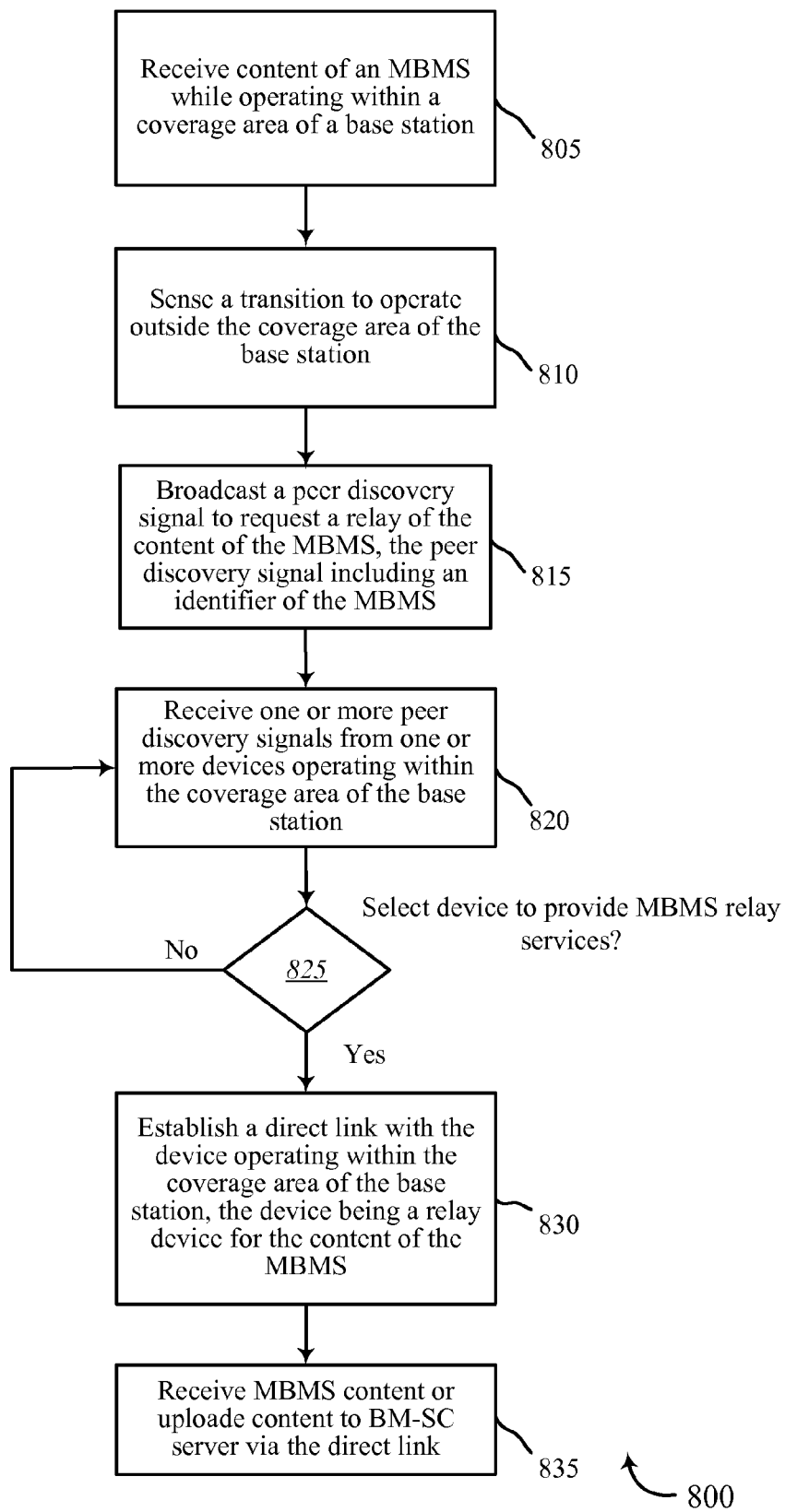

FIG. 8 is a flow chart illustrating an embodiment of a method 800 for managing an MBMS. For clarity, the method 800 is described below with reference to aspects of one or more of the mobile devices 115 described with reference to FIGS. 1, 2, 3, and/or 4. In some implementations, the peer discovery module 440 described with reference to FIGS. 4 and/or 5 may execute one or more sets of codes to control the functional elements of a mobile device 115 to perform the functions described below.

At block 805, content of an MBMS may be received while operating in a coverage area of a base station, such as one of the base stations 105 described with reference to FIGS. 1 and/or 2. In some cases, the content may be received by a mobile device 115. The mobile device 115 may be operating within the coverage area of the base station 105. In some embodiments, the content may be received at block 805 using the communications management module 430 described with reference to FIG. 4.

At block 810, a transition to operate outside the coverage of the base station 105 may be sensed (e.g., by the mobile device 115). In some cases, the transition may be sensed after operating outside the coverage area of the base station 105. In other cases, the transition may be sensed before operating outside the coverage area of the base station 105 (e.g., as the mobile device 115 is about to leave the coverage area of the base station 105, as determined, for example, by a failing signal strength of communications with the base station 105). In some embodiments, the transition may be sensed at block 810 using the peer discovery module 440 and/or sensing module 455 described with reference to FIGS. 4 and/or 5.

At block 815, a peer discovery signal to request a relay of the content of the MBMS may be broadcast (e.g., by the mobile device 115). The peer discovery signal may include an identifier of the MBMS. The peer discovery signal may in some cases be an LTE Direct, Wi-Fi Direct, Wi-Fi ad hoc, or Bluetooth discovery signal. The identifier of the MBMS may include a TMGI when the base station 105 providing the MBMS is an LTE/LTE-A/UMTS base station. In some embodiments, the peer discovery signal may be broadcast at block 815 using the peer discovery module 440 described with reference to FIGS. 4 and/or 5, and/or the peer discovery signal generating module 515 described with reference to FIG. 5.

At block 820, a peer discovery signal may be received from one or more devices operating within the coverage area of the base station (e.g., at the mobile device 115). The one or more signals may indicate the capability of the one or more devices to relay the content of the MBMS. In some cases, the one or more signal may be LTE Direct, Wi-Fi Direct, Wi-Fi ad hoc, or Bluetooth discovery signals.

At block 825, one of the devices operating within the coverage area of the base station may be identified to relay the content of the MBMS.

In some embodiments, the operation at block 820 and/or 825 may be performed using the peer discovery module 440 described with reference to FIGS. 4 and/or 5, and/or the relay services acquisition module 520 described with reference to FIG. 5.

At block 830, a direct link (e.g., a peer-to-peer link) may be established with the identified device operating within the coverage area of the base station (e.g., between the mobile device 115 and the identified device). The identified device may be an MBMS relay device for the content of the MBMS. In some embodiments, the direct link may be established at block 830 using the communications management module 330 and/or the direct link management module 460 described with reference to FIG. 4.

At block 835, data may be received and/or transmitted via the direct link. In some cases, this may include receiving content of the MBMS from the identified device operating within the coverage area of the base station 105. In other cases, this may include to the transmission of relevant data to a BM-SC server via a base station 105, and/or via other mobile devices operating within the coverage area of the base station 105. The BM-SC server may then broadcast the content of the MBMS to other subscribers of the MBMS. In still other cases, transmitting data via the direct link may include transmitting unicast data (e.g., unicast data transmitted from a mobile device 115 operating outside the coverage area of the base station 105 to the identified device operating within the coverage area of the base station 105).

Prior to receiving data, a paging message may be received. The paging message may indicate a desire of the MBMS relay device to transmit data to a recipient (e.g., the mobile device 115). Prior to transmitting data, a paging message may be transmitted (e.g., by the mobile device 115). The transmitted paging message may indicate a desire to transmit data to the MBMS relay device. Subsequent to transmitting the paging message, data may be transmitted to the MBMS relay device.

Therefore, the method 800 may be used for managing an MBMS. It should be noted that the method 800 is just one implementation and that the operations of the method 800 may be rearranged or otherwise modified such that other implementations are possible.

Figure 9:
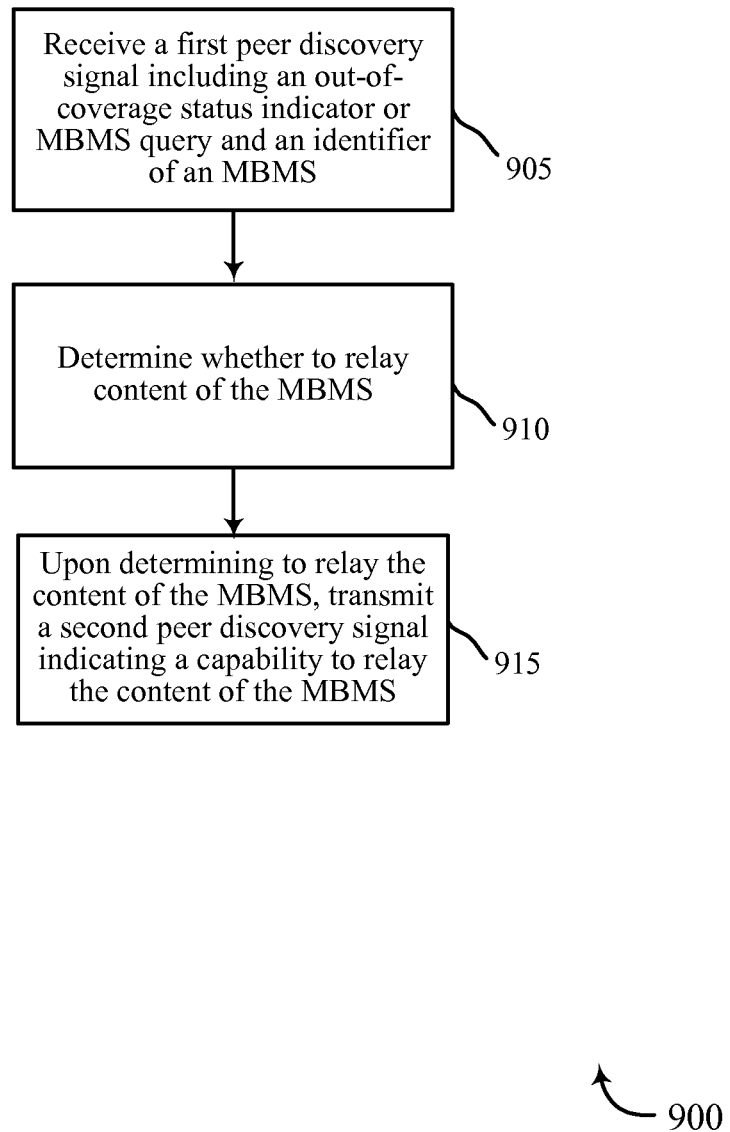

FIG. 9 is a flow chart illustrating an embodiment of a method 900 for managing an MBMS. For clarity, the method 900 is described below with reference to aspects of one or more of the mobile devices 115 described with reference to FIGS. 1, 2, 3, and/or 4. In some implementations, the peer discovery module 440 described with reference to FIGS. 4 and/or 6 may execute one or more sets of codes to control the functional elements of a mobile device 115 to perform the functions described below.

At block 905, a first peer discovery signal may be received from a mobile device 115. The peer discovery signal may include an out-of-coverage status indicator for the mobile device or MBMS query and an identifier of an MBMS. The out-of-coverage status indicator may indicate the mobile device is outside the coverage area of a base station 105. The MBMS query may be a query to participate in the identified MBMS.

At block 910, a determination regarding whether to relay content of the MBMS may be made.

In some embodiments, the operation at block 905 and/or 910 may be performed using the peer discovery module 440 and/or the status module 445 described with reference to FIGS. 4 and/or 6.

At block 915, and upon determining to relay the content of the MBMS at block 910, a second peer discovery signal indicating a capability to relay the content of the MBMS may be transmitted. In some embodiments, the second peer discovery signal may be transmitted at block 915 using the peer discovery module 440 described with reference to FIGS. 4 and/or 6, and/or the peer discovery signal generating module 515 described with reference to FIG. 6.

The method 900 may be performed by a device within the coverage area of the base station 105, and in some cases may be performed by another mobile device 115. Alternately, the method 900 may be performed by a stationary device. The method 900 may in some cases be performed by a mobile or stationary device that provides relay services as one of its core or mission functions. In other cases, the method 900 may be performed by a mobile or stationary device (e.g., a phone) that provides relay services when needed, as a secondary function.

Therefore, the method 900 may be used for managing an MBMS. It should be noted that the method 900 is just one implementation and that the operations of the method 900 may be rearranged or otherwise modified such that other implementations are possible.

Figure 10:
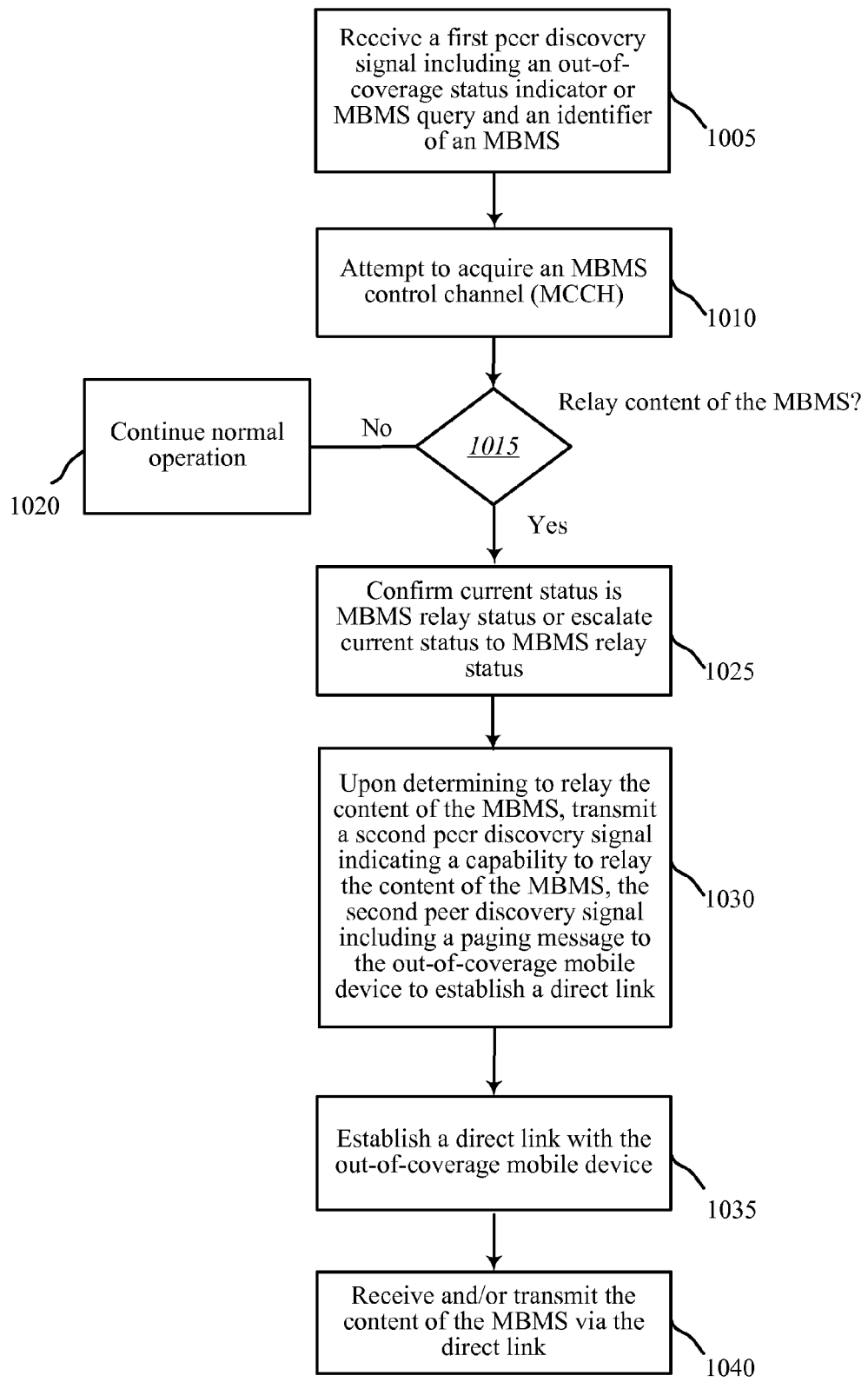

FIG. 10 is a flow chart illustrating an embodiment of a method 1000 for managing an MBMS. For clarity, the method 1000 is described below with reference to aspects of one or more of the mobile devices 115 described with reference to FIGS. 1, 2, 3, and/or 4. In some implementations, the peer discovery module 440 described with reference to FIGS. 4 and/or 6 may execute one or more sets of codes to control the functional elements of a mobile device 115 to perform the functions described below.

At block 1005, a first peer discovery signal may be received from a mobile device 115. The peer discovery signal may include an out-of-coverage status indicator for the mobile device or MBMS query and an identifier of an MBMS. The peer discovery signal may in some cases be an LTE Direct, Wi-Fi Direct, Wi-Fi ad hoc, or Bluetooth discovery signal. The identifier of the MBMS may include a TMGI when the base station 105 providing the MBMS is an LTE/LTE-A/UMTS base station. The MBMS query may be a query to participate in the identified MBMS.

At block 1010, an attempt may be made to acquire an MBMS control channel (MCCH). Acquisition of the MCCH enables a device to determine whether content of the MBMS can be received.

At block 1015, and based at least in part on acquiring the MCCH, a determination may be made regarding whether to relay content of the MBMS. When a determination is made to relay content of the MBMS, the method 1000 may continue at block 1020. When a determination is made to not relay content of the MBMS, the device performing the method 1000 may continue normal operation at block 1020.

In some embodiments, one or more additional factors may be analyzed to determine whether to relay content of the MBMS. For example, the device performing the method 1000 may determine whether an available operating power of the device exceeds a threshold, or whether an available transmission bandwidth of the device exceeds a threshold. The device may also analyze its communication with the out-of-coverage mobile device 115, such as the signal strength(s) of the peer discovery signal(s) received from the out-of-coverage mobile device 115.

In some embodiments, the operation at block 1005, 1010, 1015, and/or 1020 may be made using the peer discovery module 440 and/or the status module 445 described with reference to FIGS. 4 and/or 6.

At block 1025, the current status of the device performing the method 1000 may be confirmed to be an MBMS relay status. When the current status of the device is not already an MBMS relay status, the current status may be escalated to MBMS relay status. The MBMS relay status may indicate the capability of the device performing the method 1000 to function as an MBMS relay device between the base station 105 and the out-of-coverage mobile device 115.

At block 1030, and upon determining to relay the content of the MBMS at block 1015, a second peer discovery signal indicating a capability to relay the content of the MBMS may be transmitted. In some cases, the second peer discovery signal may include a paging message to the mobile device 115, indicating to the mobile device 115 to establish a direct link (e.g., a peer-to-peer link) with the device performing the method 1000. In some embodiments, the second peer discovery signal may be broadcast at block 1030 using the peer discovery module 440 described with reference to FIGS. 4 and/or 6, and/or the peer discovery signal generating module 515 described with reference to FIG. 6.

In some embodiments, the second peer discovery signal may be transmitted at block 1025 using the peer discovery module 440 described with reference to FIGS. 4 and/or 6, and/or the peer discovery signal generating module 515 described with reference to FIG. 6.

The method 1000 may be performed by a device within the coverage area of the base station 105, and in some cases may be performed by another mobile device 115. Alternately, the method 1000 may be performed by a stationary device. The method 1000 may in some cases be performed by a mobile or stationary device that provides relay services as one of its core or mission functions. In other cases, the method 1000 may be performed by a mobile or stationary device (e.g., a phone) that provides relay services when needed, as a secondary function.

At block 1035, a direct link (e.g., a peer-to-peer link) may be established with the out-of-coverage mobile device 115 (e.g., between the mobile device 115 and the device performing the method 1000). In some embodiments, the direct link may be established at block 1035 using the communications management module 430 and/or the direct link management module 460 described with reference to FIG. 4.

At block 1040, data may be received and/or transmitted via the direct link. In some cases, this may include transmitting content of the MBMS from the base station 105 to the out-of-coverage mobile device 115. In other cases, this may include receiving relevant data from the out-of-coverage mobile device and relaying it to a BM-SC server via the base station 105. The base station 105 may then broadcast the content of the MBMS to other subscribers of the MBMS. In still other cases, transmitting data via the direct link may include receiving unicast data from the out-of-coverage mobile device 115 and relaying the unicast data to the base station 105.

Prior to transmitting data, a paging message may be transmitted. The paging message may indicate a desire of the MBMS relay device to transmit data to the out-of-coverage mobile device 115. Prior to receiving data from the out-of-coverage mobile device 115, a paging message may be received from the out-of-coverage mobile device 115.

Therefore, the method 1000 may be used for managing an MBMS. It should be noted that the method 1000 is just one implementation and that the operations of the method 1000 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS. LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing a multimedia broadcast multicast service (MBMS), comprising:
   receiving content of an MBMS while operating in a coverage area of a base station;
   sensing a transition to operate outside the coverage area of the base station; and
   broadcasting a peer discovery signal to request a relay of the content of the MBMS, the peer discovery signal comprising an identifier of the MBMS.

2. The method of claim 1, further comprising:
   receiving one or more peer discovery signals from one or more devices operating within the coverage area of the base station, the one or more peer discovery signals indicating the capability of the one or more devices to relay the content of the MBMS.

3. The method of claim 2, further comprising:
   identifying one of the devices operating within the coverage area of the base station to relay the content of the MBMS.

4. The method of claim 1, further comprising:
establishing a direct link with an identified device operating within the coverage area of the base station, the identified device being an MBMS relay device for the content of the MBMS.

5. The method of claim 1, further comprising:
transmitting content of the MBMS, to an identified device operating within the coverage area of the base station, for retransmission to the base station.

6. The method of claim 1, further comprising:
transmitting unicast data, to an identified device operating within the coverage area of the base station, for retransmission to the base station.

7. The method of claim 1, further comprising:
transmitting a paging message to an identified device operating within the coverage area of the base station, the paging message indicating a desire to transmit data to the identified device; and
subsequent to transmitting the paging message, transmitting the data to the identified device.

8. The method of claim 1, wherein sensing the transition to operate outside the coverage area of the base station occurs after operating outside the coverage area of the base station.

9. The method of claim 1, wherein sensing the transition to operate outside the coverage area of the base station occurs before operating outside the coverage area of the base station.

10. The method of claim 1, wherein the identifier of the MBMS comprises a temporary mobile group identifier (TMGI).

11. The method of claim 1, wherein the peer discovery signal comprises a Long Term Evolution (LTE) Direct peer discovery signal.

12. An apparatus for managing a multimedia broadcast multicast service (MBMS), comprising:
means for receiving content of an MBMS while operating in a coverage area of a base station;
means for sensing a transition to operate outside the coverage area of the base station; and
means for broadcasting a peer discovery signal to request a relay of the content of the MBMS, the peer discovery signal comprising an identifier of the MBMS.

13. The apparatus of claim 12, further comprising:
means for receiving one or more peer discovery signals from one or more devices operating within the coverage area of the base station, the one or more peer discovery signals indicating the capability of the one or more devices to relay the content of the MBMS.

14. The apparatus of claim 13, further comprising:
means for identifying one of the devices operating within the coverage area of the base station to relay the content of the MBMS.

15. The apparatus of claim 12, further comprising:
means for establishing a direct link with an identified device operating within the coverage area of the base station, the identified device being an MBMS relay device for the content of the MBMS.

16. The apparatus of claim 12, further comprising:
means for transmitting content of the MBMS, to an identified device operating within the coverage area of the base station, for retransmission to the base station.

17. The apparatus of claim 12, further comprising:
means for transmitting unicast data, to an identified device operating within the coverage area of the base station, for retransmission to the base station.

18. The apparatus of claim 12, further comprising:
means for transmitting a paging message to an identified device operating within the coverage area of the base station, the paging message indicating a desire to transmit data to the identified device; and
means for, subsequent to transmitting the paging message, transmitting the data to the identified device.

19. The apparatus of claim 12, wherein the means for sensing the transition to operate outside the coverage area of the base station comprises means for sensing the transition to operate outside the coverage area of the base station after operating outside the coverage area of the base station.

20. The apparatus of claim 12, wherein the means for sensing the transition to operate outside the coverage area of the base station comprises means for sensing the transition to operate outside the coverage area of the base station before operating outside the coverage area of the base station.

21. The apparatus of claim 12, wherein the identifier of the MBMS comprises a temporary mobile group identifier (TMGI).

22. The apparatus of claim 12, wherein the peer discovery signal comprises a Long Term Evolution (LTE) Direct peer discovery signal.

23. An apparatus for managing a multimedia broadcast multicast service (MBMS), comprising:
a processor;
memory in electronic communication with the processor; and
instructions stored in the memory, the instructions being executable by the processor to:
receive content of an MBMS while operating in a coverage area of a base station;
sense a transition to operate outside the coverage area of the base station; and
broadcast a peer discovery signal to request a relay of the content of the MBMS, the peer discovery signal comprising an identifier of the MBMS.

24. The apparatus of claim 23, wherein the instructions are executable by the processor to:
receive one or more peer discovery signals from one or more devices operating within the coverage area of the base station, the one or more peer discovery signals indicating the capability of the one or more devices to relay the content of the MBMS.

25. The apparatus of claim 24, wherein the instructions are executable by the processor to:
identify one of the devices operating within the coverage area of the base station to relay the content of the MBMS.

26. The apparatus of claim 23, wherein the instructions are executable by the processor to:
establish a direct link with an identified device operating within the coverage area of the base station, the identified device being an MBMS relay device for the content of the MBMS.

27. The apparatus of claim 23, wherein the instructions are executable by the processor to:
transmit content of the MBMS, to an identified device operating within the coverage area of the base station, for retransmission to the base station.

28. The apparatus of claim 23, wherein the instructions are executable by the processor to:
transmit unicast data, to an identified device operating within the coverage area of the base station, for retransmission to the base station.

29. The apparatus of claim 23, wherein the instructions are executable by the processor to:

transmit a paging message to an identified device operating within the coverage area of the base station, the paging message indicating a desire to transmit data to the identified device; and subsequent to transmitting the paging message, transmit the data to the identified device.

30. The apparatus of claim 23, wherein the identifier of the MBMS comprises a temporary mobile group identifier (TMGI).

31. The apparatus of claim 23, wherein the peer discovery signal comprises a Long Term Evolution (LTE) Direct peer discovery signal.

32. A computer program product for managing a multimedia broadcast multicast service (MBMS), the computer program product comprising a non-transitory computer-readable medium storing instructions executable by a processor to:

receive content of an MBMS while operating in a coverage area of a base station;

sense a transition to operate outside the coverage area of the base station; and broadcast a peer discovery signal to request a relay of the content of the MBMS, the peer discovery signal comprising an identifier of the MBMS.

33. The computer program product of claim 32, wherein the instructions are executable by the processor to:

receive one or more peer discovery signals from one or more devices operating within the coverage area of the base station, the one or more peer discovery signals indicating the capability of the one or more devices to relay the content of the MBMS.

34. The computer program product of claim 33, wherein the instructions are executable by the processor to:

identify one of the devices operating within the coverage area of the base station to relay the content of the MBMS.

35. The computer program product of claim 32, wherein the instructions are executable by the processor to:

establish a direct link with an identified device operating within the coverage area of the base station, the identified device being an MBMS relay device for the content of the MBMS.

36. The computer program product of claim 32, wherein the identifier of the MBMS comprises a temporary mobile group identifier (TMGI).

* * * * *